United States Patent Office 2,742,368
Patented Apr. 17, 1956

2,742,368

STABILIZED AND RUST INHIBITED POLYMERIC ORGANOSILICON COMPOSITIONS

William T. Rossiter and Chester C. Currie, Midland, Mich., assignors to Dow Corning Corporation, Midland, Mich., a corporation of Michigan No Drawing. Application August 2, 1951, Serial No. 240,048

10 Claims. (Cl. 106—10)

The present invention relates to polymeric organosilicon compositions which are stabilized against gelation at elevated temperatures. The invention also relates to polymeric organosilicon compositions which have been rendered rust inhibiting.

More particularly, the invention is concerned with a method of stabilizing and/or rendering rust inhibiting a non-resinous polymeric organosilicon compound, which is preferably a liquid polymer containing an average of from about 1.9 to 3.5 organic groups attached to silicon per silicon atom, which method comprises incorporating in the said organosilicon compound stabilizing amounts or rust inhibiting amounts of a tin compound having the general formula $R_xSnZ_y$, where R represents a monovalent hydrocarbon radical such as an alkyl, aryl, alkaryl or aralkyl radical, Z represents an acyloxy radical, $x$ has a value of from 0 to 4 inclusive, $y$ has a value of from 0 to 4 inclusive, and the sum of $x+y$ has a value of from 2 to 4 inclusive.

Various methods have been described in the art for stabilizing organosiloxanes. Such methods, however, have had certain defects such as causing discoloration of the liquid or giving only a limited degree of stabilization, and so far as is known, none of the prior stabilizers also provided rust inhibiting properties.

The liquid organosilicon polymers and copolymers are known to have a high degree of heat stability. At elevated temperatures they resist decomposition much better than do the conventional organic liquids such as esters, mineral oils, vegetable oils, etc. However, in the presence of air and at temperatures of 200° C. and above, even these stable organosilicon polymers are subject to changes in viscosity and eventually to gelation. Furthermore, these polymers leave much to be desired insofar as their rust inhibiting properties are concerned.

It is an object of the present invention to provide improved methods for stabilizing polymeric organosilicon compositions and for rendering organosilicon compositions rust inhibiting. Further objects are to provide improved liquid polymeric organosilicon compositions and improved polishing compositions. Further objects and advantages will be apparent from the following description.

The polymeric organosilicon compounds with which this invention is particularly concerned are those containing an average of from about 1.9 to 3 organic groups attached to silicon per silicon atom, although the upper limit can go as high as 3.5 for dimers such as, for example, (CH₃)₃SiCH₂Si(CH₃)₃ and (CH₃)₃SiC₆H₄Si(CH₃)₃. Examples of such organic groups include hydrocarbon radicals such as alkyl, e. g. methyl, ethyl, butyl, octadecyl, etc.; aryl, e. g. phenyl, diphenyl, naphthyl, etc.; aralkyl, e. g. benzyl; alkaryl, e. g. tolyl and xylyl; and alicyclic, e.g. cyclohexyl; as well as substituted hydrocarbon radicals such as halophenyl. The organic groups in the polymer can be the same or different, and mixtures of various polymers can be employed if desired. The polymers include the well known and commercially available organopolysiloxanes which are characterized essentially by a

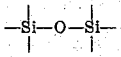

type of structure, the methylene linked organosilicon polymers with a

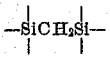

structure as for example those described in U. S. Patent No. 2,511,812, the phenylene linked polymers with a

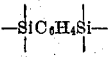

structure as for example those described in U. S. Patent No. Re. 23,270, and polymers with both siloxane and methylene linkages such as those described in U. S. Patents 2,444,858, 2,511,056, and 2,507,519. The polymers may also contain minor amounts of Si—Si linked units. The polymers include linear, cyclic and partially cross-linked molecular structures. They are preferably substantially free of reactive substituents attached to silicon, such as hydroxy, alkoxy, aryloxy, acyloxy, amino, and halo radicals, meaning that they can have minor amounts of such substituents as long as the stability of the compound is not materially affected thereby.

The preferred organosilicon polymers with which this invention is concerned are the organopolysiloxanes, particularly the methyl and phenyl substituted siloxanes, as for example those having the general formula

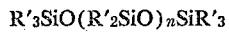

where R' is methyl or phenyl or mixtures of such radicals, preferably there being at least some methyl radicals present, and where the average value of $n$ is any number, including zero.

The principle of this invention is particularly adapted to the liquid non-resinous organosilicon polymers. However, by "liquid" polymers it is not meant that the polymers are necessarily liquid at ordinary temperatures, for the properties of stability and rust inhibition are also imparted to organosilicon compositions which are crystalline or waxy at ordinary temperatures. The invention stabilizes only the non-resinous polymers, however, for when some of the tin compounds of this invention are applied to resinous organosilicon compounds a catalytic effect upon the curing time of the resin is obtained. Hence, the stabilization achieved by this invention is entirely unsuspected and surprising.

The tin compounds employed in the present invention have the general formula $R_xSnZ_y$, where R represents an alkyl, aryl, alkaryl, or aralkyl radical and may be the same or different radicals, Z represents an acyloxy radical, $x$ and $y$ both have a value of from 0 to 4 inclusive and the sum of $x+y$ has a value of from 2 to 4 inclusive. The preferred compounds are those in which $x$ is 2 or 4 and in which $y$ is 2 or 0. Mixtures of the various tin compounds may be used if desired, thus $x$ and $y$ may have average values which are fractional. When R in the above formula is alkyl, it is preferred that at least one of the R's contains from 2 to 12 carbon atoms. When R is aryl, a monocyclic radical such as phenyl is preferable. The acyloxy radical Z is preferably one of from 2 to 18 carbon atoms. The aliphatic acyloxy radicals, such as acetate, ethylhexoate, and laurate are particularly preferred, and when $x$ is 0 it is preferable that the aliphatic acyloxy radical contain from 4 to 12 carbon atoms. Thus, the preferred tin compounds for use in the present invention can be defined as being selected from the group consisting of tin salts of organic monocarboxylic acids of from 4 to 12 carbon atoms, compounds of the general formula $R_4Sn$ where R represents a radical of the group consisting of alkyl radicals of from 1 to 12 carbon atoms and monocyclic aryl radicals, and compounds of the general formula $R_2SnZ_2$ where R is as defined above and Z represents an acyloxy radical of from 2 to 18 carbon atoms.

The selection of the best tin compound for a given organosilicon composition will depend upon the use to be made of the composition and upon the commercial availability of the tin compound. Where no other carrier, such as an organic solvent, is to be present, the tin compound should obviously be soluble in the organosilicon polymer to an extent which produces the desired stabilization or rust inhibiting properties. When the composition is to be used as a solution or emulsion, however, solubility of the tin compound in the organosilicon polymer is not absolutely essential. Examples of commercially available tin compounds which are relatively highly soluble in organosilicon polymers are: dibutyl tin diacetate, dibutyl tin dilaurate, tetrabutyl tin, tetraphenyl tin, and stannous 2-ethyl hexoate. Dibutyl tin dimaleate and tetralauryl tin are only slightly soluble in polymeric organosiloxane liquids but are readily soluble in organic solvents, and dibutyldiphenyl tin is also highly soluble in such solvents. Compounds such as diphenyl tin oxide and triphenyl tin hydroxide are only very slightly soluble in the organosilicon polymers.

The tin compounds vary in their effectiveness as to stabilization or rust inhibiting properties. For example, both dibutyl tin dilaurate,

and tetrabutyl tin have excellent properties as both stabilizing and rust inhibiting agents whereas tetraphenyl tin and dibutyl tin diacetate,

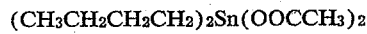

are not as good as rust inhibitors but are good stabilization agents. Stannous 2-ethyl hexoate is an excellent stabilization agent.

The choice of a suitable tin compound is also obviously dependent on other factors, such as the conditions under which the final composition is to be used. Thus a comparatively low boiling tin compound such as tetraethyl tin, which has a boiling point of 181° C., would not be used in a composition which would be subjected to relatively high temperatures such as 200° to 250° C. For this reason if some of the organic groups attached to the tin are low molecular weight groups, it is preferable that the remaining groups are of higher molecular weight in order to decrease the volatility of the tin compound. Hence, a tin compound such as methyltributyl tin, with a boiling point of about 121° C. at a pressure of 10 mm. Hg, could be used where tetraethyl tin could not. Likewise the use of tin compounds which are subject to decomposition at elevated temperatures, such as diethyl tin which decomposes at 150° C. and ditolyl tin which decomposes at 245° C., should not be used in compositions which are to be subjected to such temperatures.

Obviously consideration must also be given to the stability of the tin compound towards water. Stannous acetate, for instance, decomposes in water and would be objectionable in emulsion compositions or in compositions exposed to water even if its solubility characteristics were satisfactory. Stannous 2-ethylhexoate, on the other hand, is considerably more stable in this respect. Dibutyl tin dilaurate is apparently unaffected by water alone, but is easily hydrolyzed by caustic solutions and such contact should therefore be avoided.

The amount of the tin compound employed is dependent upon the effects desired and the particular compound used. Merely trace amounts will of course give some stabilization and/or rust inhibiting properties, and an amount sufficient to provide the organosilicon polymer with such properties should be employed. The amount of the tin compound employed ordinarily ranges from about 0.01 per cent to 1.0 per cent by weight, based upon the weight of the organosilicon polymer, the preferred amount being in the range of from 0.1 to 0.5 per cent by weight. Where the solubility of the tin compound permits, amounts greater than 1.0 per cent by weight may be employed, but this does not ordinarily increase the advantages obtained from the smaller amounts.

The stabilized liquid organosilicon polymers of this invention are of improved utility as dielectrics, lubricants, hydraulic liquids, etc. The rust-inhibited organosilicon polymers are of like utility, and are also useful in protective coatings and polishing compositions. The treated polymers can also be used in the formulation of greases of improved stability and rust inhibiting properties.

The polishing compositions formed from the rust inhibited organosilicon polymers of the present invention may be of the emulsion type, solvent solution type, solvent suspension type, or paste type. The organosilicon polymers employed in these polishes are preferably organopolysiloxanes. They are also preferably liquids, with a ratio of organic groups per silicon atom ranging from 1.9:1 to 3:1, although materials other than the liquid polymers may be employed or included in the composition. Thus, waxy polymers and crystalline polymers, as long as such polymers are soluble in an organic solvent, may be used in the polish. The polishes are otherwise formulated and prepared in conventional manners.

The polishing compositions are thus preferably comprised of from 0.5 to 15 per cent by weight of the hydrocarbon-soluble organosilicon polymer containing rust-inhibiting amounts of the above defined tin compounds, from 0 to 10 per cent by weight of a water-insoluble organic polishing wax, from 15 to 90 per cent by weight of a hydrocarbon solvent boiling between 100° C. and 300° C., from 0 to 20 per cent by weight of a finely divided silica having an average particle size of less than 10 microns in diameter, from 0 to 6 per cent by weight of an emulsifying agent, from 0 to 70 per cent by weight water, and from 0 to 3 per cent by weight of aluminum monostearate or aluminum distearate. The "rust-inhibiting amounts" referred to above are preferably in the range of from 0.00005 to 0.15 per cent by weight based on the total weight of the polishing composition.

The ingredients used in the above defined polish are varied in amount according to the type of polish desired. Thus in a solution polish the emulsifying agent, water, and aluminum stearate are omitted. The aluminum stearate is also omitted from an emulsion polish, but is included in a paste polish. The organic wax and the silica may be omitted from or included in each type of polish.

The paste type polish is preferably comprised of from 2 to 15 per cent by weight of the organosilicon polymer, from 0.00005 to 0.15 per cent by weight of the defined tin compounds, from 10 to 45 per cent by weight of the hydrocarbon solvent, from 0.5 to 3 per cent by weight of aluminum monostearate or aluminum distearate, from 0 to 10 per cent by weight of an organic polish wax, and from 37 to 87.5 per cent by weight water. A preferred method of preparing this paste type of polish is that of mixing the organosilicon compound, tin compound, solvent, and aluminum stearate and heating the mixture until it is homogeneous. This mixture is rapidly agitated at the elevated temperature while heated water is added thereto. The resulting emulsion is agitated until a uniform product is obtained. This product can be varied in consistency from that of a thick cream to that of a heavy paste. The use of a colloid mill or other high speed mixer such as an Eppenbach mixer is preferable in preparing these paste-type emulsions.

The aqueous emulsion type of polish is preferably comprised of from 0.5 to 15 per cent by weight of the organosilicon polymer, from 0.00005 to 0.15 per cent by weight of the defined tin compounds, from 0 to 10 per cent by weight of the organic polishing waxes, from 15 to 60 per cent by weight of the hydrocarbon solvent, from 0 to 20 per cent by weight of the silica, from 1 to 6 per cent by weight of the emulsifying agent, and from 20 to 70 per cent by weight water. A preferred method of preparing such an emulsion is that of heating the mixture of hydrocarbon solvent, organic wax if such is used, the organosilicon polymer, and a portion of the emulsifying agent to the temperature at which substantial homogeneity is obtained, and then with extremely rapid agitation adding hot water in which the remainder of the emulsifying agent has been dissolved or dispersed. If it is desired to include an abrasive in the polish, it may be added during emulsification as a dispersion in the hot water, or it may be added to the finished emulsion.

The solvent type polish preferably comprises from 0.5 to 15 per cent by weight of the organosilicon polymer, from 0.00005 to 0.15 per cent by weight of the defined tin compounds, from 0 to 10 per cent by weight of the organic polishing wax, from 0 to 20 per cent by weight of the silica and from 60 to about 90 per cent by weight of the hydrocarbon solvent. Such a polish is prepared merely by mixing the ingredients and heating if necessary.

The preferred solvents for use in these polishing compositions are petroleum and coal tar hydrocarbons boiling between 100° C. and 300° C.

If organic waxes are employed, the conventional water insoluble polishing waxes capable of being polished to a hard, glossy surface may be used. It is preferable that they have a melting point above 150° F. and a penetration under a 100 gram load of less than 20 as expressed in cm. $\times 10^{-2}$ in 60 seconds at 77° F., ASTM D-5-25. Examples of preferred waxes are vegetable waxes such as carnauba and candelilla; mineral waxes such as paraffin, microcrystalline ceresin, and montan; manufactured or modified waxes such as the "Gersthofen" (formerly "I. G.") waxes; and mixtures thereof.

Finely divided silica may be incorporated in the polish as a cleaner. This material should have an average particle size of less than 10 microns in diameter. Natural occurring silicas such as diatomaceous earth and Tripoli silica have the requisite particle size and are preferred. If a cleansing agent is not desired in the emulsion, it may be left out without affecting the polishing quantities of the emulsion.

The emulsifying agents employed in this invention are commercially available materials and may be of either the cationic, anionic, or nonionic types. Examples of such materials are morpholine salts of fatty acids wherein the fatty acid contains from 12 to 18 carbon atoms, such as morpholine oleate and morpholine stearate; acetates of n-primary amines having from 12 to 18 carbon atoms in the amine chain, such as n-dodecyl amine acetate, n-octadecenyl amine acetate, and n-octadecadienyl amine acetate; monoesters of polyethylene glycols and fatty acids of 12 to 18 carbon atoms such as hexaethylene glycol monooleate; and alkylated aryl polyether alcohols.

The polishes prepared in accordance with this invention are of particular utility in polishing metallic surfaces. As applied to such surfaces the polishing compositions not only produce a high luster but also retard to a great extent the tendency of such surfaces to rust. These polishes are thus particularly useful on chromium plated steel surfaces, such as those commonly used as decorative trimming on automobiles.

The following examples are illustrative only. All parts given are parts by weight.

EXAMPLE 1

0.35 part of dibutyl tin dilaurate was dissolved in 35 parts of trimethylsiloxy end-blocked dimethylpolysiloxane fluid having a viscosity of 95.4 centistokes at 25° C. The product was placed in an oven maintained at 250° C., along with a control sample of the same fluid. The control sample gelled in 45 hours. The sample to which the tin compound had been added was still liquid after 15 days.

EXAMPLE 2

Various tin compounds were dissolved in a trimethylsiloxy end-blocked dimethylpolysiloxane fluid having a viscosity of 211 centistokes at 25° C. Samples of each product and a control sample having no additive were placed in an oven maintained at 200° C. The effect of the additives upon the gel time of the fluid is shown in Table I below. The amount of additive used is indicated as per cent by weight, based on the weight of the fluid. Where results are shown as ">" (greater than) a given time, the tests were still running, with no gelation of the fluid, at the time of writing this specification.

Table I

| Additive | Percent | Gel Time, 200° C. |
|---|---|---|
| | | Days |
| None | 0 | 5 |
| Dibutyl tin diacetate | 0.2 | >150 |
| Dibutyl tin dilaurate | 0.2 | >150 |
| Stannous 2-ethylhexoate | 0.67 | >150 |
| Tetrabutyl tin | 0.2 | 21 |
| Tetraphenyl tin | 0.2 | 22 |

EXAMPLE 3

When the tin compounds shown in Example 2 are added to liquid phenylmethylpolysiloxanes, diethylpolysiloxanes, butylmethylpolysiloxanes, methyl and phenyl substituted methylene linked organosilicon polymers, phenylene linked organosilicon polymers, and polymers with both methylene and siloxane linkages, the liquids are rendered more stable to gelation and changes in viscosity at temperatures of 200° C. and above.

EXAMPLE 4

Samples of the compositions prepared in Example 2 were tested for their rust inhibiting properties in an accelerated rusting test. The test was conducted by cutting steel shim stock (0.01 inch thick) into equilateral triangles. A slight indentation was made in the center of each triangle with a steel ball. The points of the triangle were bent down so that it would stand on the bottom of a 150 ml. beaker, in which it was placed. The triangle was covered with the test oil (about 50 ml.) and about 1 ml. of water placed in the indentation. This assembly was placed in an oven at 70° C. and observed for the first signs of rusting. The time in hours required for any indication of rusting is shown in Table II below.

Table II

| Additive | Percent | Rust time, Hours |
|---|---|---|
| None | | <1 |
| Dibutyl tin diacetate | 0.2 | 3 |
| Dibutyl tin dilaurate | 0.2 | 34 |
| Stannous 2-ethylhexoate | 0.67 | 26 |
| Tetrabutyl tin | 0.2 | 144 |
| Tetraphenyl tin | 0.2 | 3 |

EXAMPLE 5

In another type of test for rating rust inhibiting properties, steel shim stock panels (.01" x 1.5" x 3") were polished with the composition to be tested. The test panels were then suspended vertically over 1500 ml. of water in a 3 liter beaker, and 7 to 9 cubic feet of air per hour was bubbled through the water at a temperature of 49 to 52° C. These conditions provide a continual slow dripping of water as it condenses on the panels. The panels were examined visually for rusting.

When tested as above, the control fluid of Example 2 allowed severe rusting in 4 hours, whereas the fluid containing 0.2 per cent dibutyl tin dilaurate allowed only slight rusting in 26 hours. The fluid containing 0.2 per cent tetrabutyl tin was not quite as good as that containing the dibutyl tin dilaurate, although this contradicts the findings in Example 4.

EXAMPLE 6

Organosiloxane fluids composed of $(CH_3)_2SiO$, $C_6H_5CH_3SiO$ and $(CH_3)_3SiO_{0.5}$ units, which fluids contained from 10 to 85 molar per cent respectively of the $C_6H_5CH_3SiO$ units, were mixed with from 0.1 to 1.0 per cent by weight of dibutyl tin dilaurate, tetrabutyl tin, and mixtures of the two. Panels were polished with these test compositions and tested as in Example 5 along with panels polished with control fluids containing no additives. The test period was 24 hours, in which time all control panels were very badly pitted and rusted. The test panels all showed much less rusting than the controls. Maximum protection was obtained from the samples containing 1.0 per cent by weight of the dibutyl tin dilaurate.

EXAMPLE 7

When dibutyl tin dilaurate is added to liquid diethylpolysiloxanes, butylmethylpolysiloxanes, methylene or phenylene linked organosilicon polymers, and to dimers such as $[C_6H_5(CH_3)_2Si]_2O$ the liquids are rendered relatively rust inhibiting when tested as in Example 5.

EXAMPLE 8

A grease was prepared by mixing 10 parts of carbon black and 90 parts of an organopolysiloxane containing 0.2 per cent by weight dibutyl tin dilaurate. The organopolysiloxane used was composed of $(CH_3)_2SiO$, $C_6H_5CH_3SiO$ and $(CH_3)_3SiO_{0.5}$ units in the approximate molar ratio of 40:50:10. The grease had an enhanced heat stability.

EXAMPLE 9

A solvent type polish which had excellent polishing and preservative effects on chromium plated steel was prepared as follows. 4 parts of a trimethylsiloxy end-blocked dimethylpolysiloxane fluid containing 0.2 per cent by weight of dibutyl tin dilaurate, 2 parts carnauba wax, and 8 parts naphthol mineral spirits were heated until the wax was in solution. 76 parts naphthol mineral spirits and 10 parts of diatomaceous earth were then added, and the mixture agitated. This composition gave good rust protection when tested as in Example 5.

EXAMPLE 10

An emulsion type polish was prepared by mixing with extremely rapid agitation 4 parts of a trimethylsiloxy end-blocked dimethylpolysiloxane fluid containing 0.2 per cent by weight dibutyl tin dilaurate, 19 parts Stoddard solvent, 2 parts kerosene, 2.5 parts oleic acid, 1.5 parts morpholine, and 16 parts of water. This resulted in a thick phase emulsion, which was then diluted with 41 parts of water containing 14 parts of finely divided silica. The resulting emulsion was stable and non-creaming. It was tested on panels as in Example 5, and provided good rust protection.

That which is claimed is:

1. The method of stabilizing and rendering rust inhibiting a liquid organopolysiloxane having a ratio of from 1.9 to 3 organic groups attached to silicon per silicon atom, said organic groups being selected from the group consisting of methyl and phenyl radicals, which comprises incorporating therein from 0.01 to 1.0 per cent by weight, based on the weight of the organopolysiloxane, of dibutyl tin dilaurate.

2. The method of stabilizing and rendering rust inhibiting a liquid organopolysiloxane having a ratio of from 1.9 to 3 organic groups attached to silicon per silicon atom, said organic groups being selected from the group consisting of methyl and phenyl radicals, which comprises incorporating therein from 0.01 to 1.0 per cent by weight, based on the weight of the organopolysiloxane, of tetrabutyl tin.

3. A stabilized and rust-inhibiting organosilicon composition consisting essentially of a liquid organopolysiloxane having a ratio of from 1.9 to 3 organic groups attached to silicon per silicon atom, said organic groups being selected from the group consisting of methyl and phenyl radicals, and from 0.01 to 1.0 per cent by weight, based on the weight of the organopolysiloxane, of dibutyl tin dilaurate.

4. A stabilized organosilicon composition consisting essentially of a liquid organopolysiloxane having a ratio of from 1.9 to 3 organic groups attached to silicon per silicon atom, said organic groups being selected from the group consisting of methyl and phenyl radicals, and from 0.01 to 1.0 per cent by weight, based on the weight of the organopolysiloxane, of stannous 2-ethyl hexoate.

5. The method of stabilizing and rendering rust inhibiting a liquid organopolysiloxane having a ratio of from 1.9 to 3 inclusive organic groups attached to silicon per silicon atom, said organic groups being selected from the group consisting of methyl and phenyl radicals, which comprises incorporating therein from 0.01 to 1.0 per cent by weight, based on the weight of the organopolysiloxane, of a tin compound selected from the group consisting of (1) compounds of the general formula $R_2SnZ_2$, where R represents an alkyl radical of from 2 to 12 inclusive carbon atoms and Z represents an aliphatic acyloxy radical of from 2 to 12 inclusive carbon atoms, (2) stannous salts of aliphatic monocarboxylic acids of from 4 to 12 inclusive carbon atoms, (3) tetrabutyl tin, and (4) tetraphenyl tin.

6. The method of stabilizing and rendering rust inhibiting a liquid organopolysiloxane having a ratio of from 1.9 to 3 inclusive organic groups attached to silicon per silicon atom, said organic groups being selected from the group consisting of methyl and phenyl radicals, which comprises incorporating therein from 0.01 to 1.0 per cent by weight, based on the weight of the organopolysiloxane, of a tin compound of the formula $R_2SnZ_2$ where R represents an alkyl radical of from 2 to 12 inclusive carbon atoms and Z represents an aliphatic acyolxy radical of from 2 to 12 inclusive carbon atoms.

7. The method of stabilizing and rendering rust inhibiting a liquid organopolysiloxane having a ratio of from 1.9 to 3 inclusive organic groups attached to silicon per silicon atom, said organic groups being selected from the group consisting of methyl and phenyl radicals, which comprises incorporating therein from 0.01 to 1.0 per cent by weight, based on the weight of the organopolysiloxane, of a compound of the formula $Bu_2SnZ_2$ where Bu represents the n-butyl radical and Z represents an aliphatic acyloxy radical of from 2 to 12 inclusive carbon atoms.

8. A stabilized and rust-inhibiting organosilicon composition consisting essentially of a liquid organopolysiloxane having a ratio of from 1.9 to 3 inclusive organic groups attached to silicon per silicon atom, said organic groups being selected from the group consisting of methyl and phenyl radicals, and from 0.01 to 1.0 per cent by weight, based on the weight of the organopolysiloxane, of a tin compound selected from the group consisting of (1) compounds of the general formula $R_2SnZ_2$, where R represents an alkyl radical of from 2 to 12 inclusive carbon atoms and Z represents an aliphatic acyloxy radical of from 2 to 12 inclusive carbon atoms, (2) stannous salts of aliphatic monocarboxylic acids of from 4 to 12 inclusive carbon atoms, (3) tetrabutyl tin, and (4) tetraphenyl tin.

9. A stabilized and rust-inhibiting organosilicon composition consisting essentially of a liquid organopolysiloxane having a ratio of from 1.9 to 3 inclusive organic groups attached to silicon per silicon atom, said organic groups being selected from the group consisting of methyl and phenyl radicals, and from 0.01 to 1.0 per cent by weight, based on the weight of the organopolysiloxane, of a compound of the formula $R_2SnZ_2$ where R represents an alkyl radical of from 2 to 12 inclusive carbon atoms and Z represents an aliphatic acyloxy radical of from 2 to 12 inclusive carbon atoms.

10. A stabilized and rust-inhibiting organosilicon composition consisting essentially of a liquid organopolysiloxane havng a ratio of from 1.9 to 3 inclusive organic groups attached to silicon per silicon atom, said organic groups being selected from the group consisting of methyl and phenyl radicals, and from 0.01 to 1.0 percent by weight, based on the weight of the organopolysiloxane, of a compound of the formula $Bu_2SnZ_2$ where Bu represents the n-butyl radical and Z represents an acyloxy radical of from 2 to 12 inclusive carbon atoms.

References Cited in the file of this patent

UNITED STATES PATENTS

| | | |
|---|---|---|
| 2,187,802 | Colin | Jan. 23, 1940 |
| 2,267,779 | Yngve | Dec. 30, 1941 |
| 2,307,092 | Yngve | Jan. 5, 1943 |
| 2,334,566 | Lincoln | Nov. 16, 1943 |
| 2,389,806 | McGregor | Nov. 27, 1945 |
| 2,447,483 | Baker | Aug. 24, 1948 |
| 2,523,281 | Currie | Sept. 26, 1950 |
| 2,592,926 | Mack et al. | Apr. 15, 1952 |
| 2,614,049 | Swanson | Oct. 14, 1952 |
| 2,623,892 | Cleverdon et al. | Dec. 30, 1952 |
| 2,666,685 | Hommel et al. | Jan. 19, 1954 |